Figure 6:
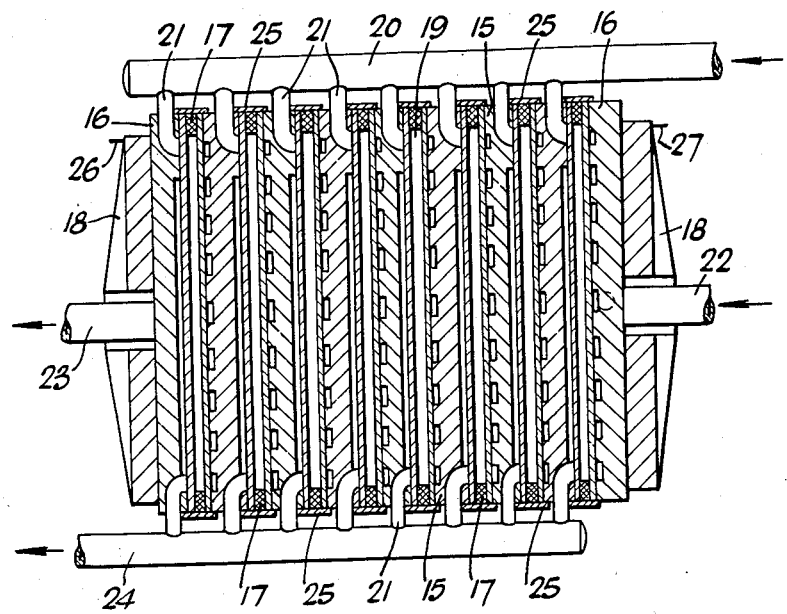

Aug. 20, 1963  A. D. S. TANTRAM ETAL  3,101,285
FUEL CELLS
Filed March 27, 1961  2 Sheets-Sheet 1
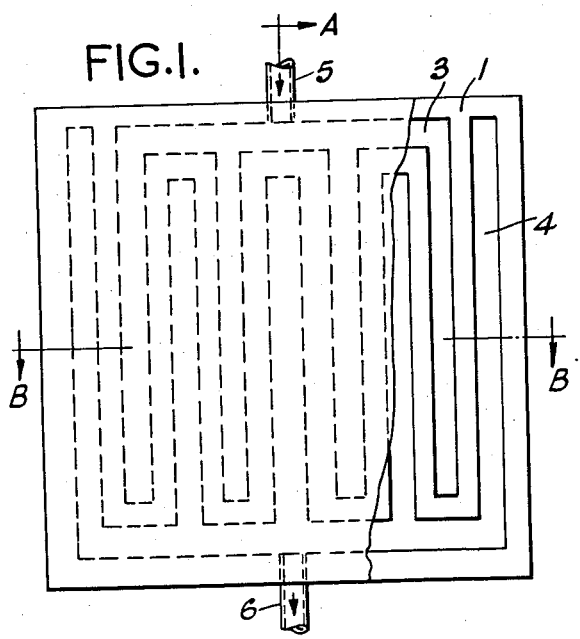
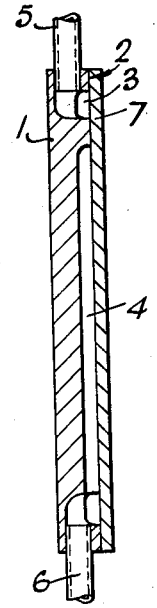
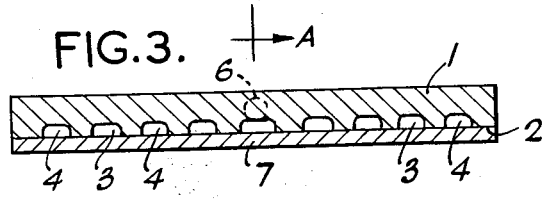
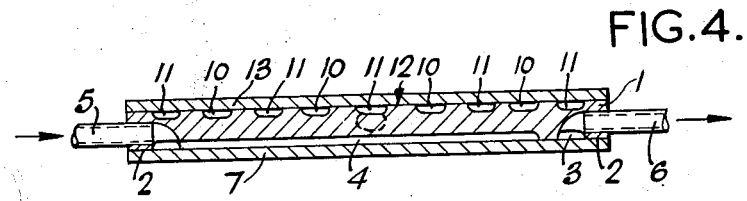
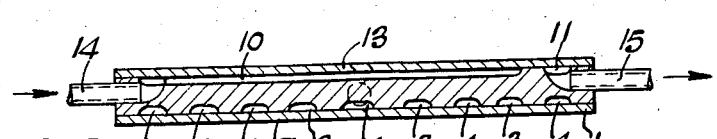
INVENTORS:
ANTHONY DESMOND SHAND TANTRAM
BRYAN SIDNEY HARRIS
By: Stevens, Davis, Miller & Mosher
Attorneys United States Patent Office 3,101,285
Patented Aug. 20, 1963

3,101,285
FUEL CELLS
Anthony Desmond Shand Tantram and Bryan Sidney Harris, Dorking, England, assignors to National Research Development Corporation, London, England, a British corporation
Filed Mar. 27, 1961, Ser. No. 98,441
Claims priority, application Great Britain Apr. 1, 1960
10 Claims. (Cl. 136—120)

This invention relates to the manufacture of electrodes for fuel cells.

The production of electricity in a fuel cell takes place by the simultaneous oxidation of a fuel gas at a fuel electrode and the reduction of an oxidising gas, for example oxygen, at an oxygen electrode. The electrodes are in contact with an electrolyte and the oxidation and reduction of the gases takes place at a position in the electrodes where the gases and electrolyte meet. It is necessary to provide means for supplying fresh gases to this position in each electrode and also means for removing any spent gases and the like.

Generally, each electrode, or at least that portion in which the chemical reaction takes place, is made of porous material, a flow of gases occurring through the material.

As the electrodes are increased in size, the flow path for the gases from the inlet to the exhaust increases and an undesirable back pressure occurs, and it is an object of the present invention to provide an electrode construction in which the flow path of the gases can be arranged so that increasing the size of the electrode does not materially increase the back pressure of the flow path.

According to the invention there is provided an electrode for a fuel cell comprising a support member in the form of a thin flat plate, at least one face of the support member being shaped to define two sets of grooves, one set of grooves for supplying fresh gas and the other set for removal of spent gas, the two sets of grooves being interleaved, a porous layer of electrode material attached to the said face and means for supplying fresh gas to one set of grooves and exhausting spent gas from the other set of grooves.

Normally a number of fuel cell elements are assembled together to form a battery and in such cases the electrodes are conveniently bi-polar, the gas being supplied to one side of the support member and an oxidising gas being fed to the other side. According to a further feature of the invention there is provided an electrode structure for a fuel cell comprising a support member in the form of a flat plate, both faces of the support member being shaped to define two sets of grooves on each face, one set for supplying a gas and the other for exhausting spent gas, the two sets of grooves being interleaved, a porous layer of electrode material attached to each face, and means for supplying a fuel gas to one set of grooves on one face and an oxidising gas to one set of grooves on the other face and means for exhausting the spent fuel gas and oxidising gas respectively from the other sets of grooves on each face. The invention will be readily understood by the following description of certain embodiments by way of example in conjunction with the following drawings in which:

FIGURE 1 is a view of one face of a support member forming a monopolar electrode, with part of the porous electrode material removed, FIGURE 2 is a cross-section on the line A—A of FIGURE 1, FIGURE 3 is a cross-section on the line B—B of FIGURE 1, FIGURE 4 is a cross-section similar to FIGURE 2, but of a bi-polar electrode, FIGURE 5 is a cross-section similar to FIGURE 3 but also of a bi-polar electrode, and FIGURE 6 is a digrammatic cross-section through a battery of fuel cell elements.

In FIGURES 1, 2 and 3, the electrode comprises a square support plate 1 on one face 2 of which are formed two sets of grooves 3 and 4. The sets of grooves are each in the form of a series of longitudinal grooves parallel to each other, connected together at one end of a further groove. The two sets of grooves will look somewhat like two combs, the longitudinal grooves of one set being positioned between the longitudinal grooves of the other set. The grooves connecting the ends of the lateral grooves are close to the edges of the plate. Two pipes 5 and 6 are inserted through holes drilled on opposite sides of the support member one pipe 5 communicating with the set of grooves 3 the other pipe 6 communicating with the other set of grooves 4. A layer of porous electrode material 7 is attached to that surface of the support member 1 in which are formed the grooves 2 and 4.

When in operation fresh gas is supplied through the pipe 5 to the support grooves 3. The gas passes from the grooves 3 through the porous electrode material 7, spent gas emerging into the grooves 4 and exhausting through pipes 6.

The electrode material may be applied to the support plate in various ways a typical example being as follows. The grooves 3 and 4 are first filled with a removable filler, such as salt or wax. The porous electrode material is then applied by, for example, flame spraying. Alternatively electrode material may be applied by sintering. Where the material is flame sprayed, the filler is preferably salt, the electrode material being applied by any suitable flame spray apparatus, a powder type gun being particularly suitable. The filler is then removed, for example by dissolving the water. When the electrode material is sintered on, the filler is preferably wax. The electrode material is applied to the surface of the support plate, for example in the form of a slurry, after drying, the support plate with the layer of electrode material is placed in a furnace for the sintering of electrode material. During the sintering the wax filler is volatilised. The electrode material may be in two layers, a coarse pore layer and a fine pore layer. In this case, the fine pore layer is remote from the support plate.

The bi-polar electrode is shown in FIGURES 4 and 5. The form of the support plate is substantially the same as in the monopolar electrode form, with the exception that a further set of grooves 10 and 11 are formed in the face 12 of the support plate. A further layer of porous electrode material 13 is placed to the face 12 over the grooves 10 and 11. A further supply pipe 14 and a further exhaust pipe 15 are provided the supply pipe 14 communicating with grooves 10 and the exhaust pipe 15 communicating with grooves 11.

When in use in a fuel cell the fuel gas is fed to one of the supply pipes for example pipe 5 from which as described above the fuel gas flows through the grooves 3 into the porous electrode material 7. The spent gas exhausts from the porous electrode material 7 into the grooves 4 exhausting through pipes 6. The oxidising gas is supplied to the other supply pipe i.e. pipe 14 from which it flows into the grooves 10. The oxidising gas then flows from the grooves 10 through the porous electrode material 13 the spent gas flowing into grooves 11 and exhausting from pipe 15.

FIGURE 6 states diagrammatically a section through a battery of fuel cell elements. In such a battery a number of bi-polar electrodes 15 are clamped together with a monopolar electrode 16 on each end. The electrodes have spaces 17 of insulating material between their opposing faces, the whole being clamped into one unit by means of end plates 18 by bolts (not shown) passing through extensions of the end plates 18. A suitable electrolyte fills the spaces 19 between the electrodes.

In operation fuel gas is supplied to a manifold 20 the gas being fed from the manifold by supply pipes 21 to one set of grooves in the support plates. A further manifold 22 supplies an oxidising gas to one of the sets of grooves on the other face of the support plates. The spent gases are exhausted into manifolds 23 and 24 respectively. Straps 25 may be positioned round the outside of the electrodes to prevent leakage of gases through the porous electrode material. The electrical power is extracted from the battery by means of terminals 26 and 27.

The support plate may be of metal such as stainless steel or of sintered material such as sintered ceramic. The porous electrode material may also vary typical examples are silver, nickel, iron, copper, silver coated zinc oxide, silver coated aluminium oxide etc.

We claim:
1. An electrode for a fuel cell comprising a support member in the form of a thin flate plate, at least one face of the support member being shaped to define two sets of grooves, one set for supplying fresh gas and the other set for removal of spent gas, the two sets of grooves being interleaved, a porous layer of electrode material attached to the said face and means for supplying fresh gas to one set of grooves and means for exhausting spent gas from the other set of grooves.

2. A bi-polar electrode for a fuel cell comprising a support member in the form of a thin flat plate, each face of the support member being shaped to define two sets of interleaving grooves, one set for supplying fresh gas and the other set for the removal of spent gas, a porous layer of electrode material attached to each of the said faces, means for supplying a fuel gas to one set of grooves on one face, and means for exhausting spent fuel gas from the other set of grooves on the one face, means for supplying an oxidising gas to one set of grooves on the other face and means for exhausting the spent oxidising gas from the other set of grooves on the other face.

3. An electrode as claimed in claim 1 in which the porous layer of electrode material has a coarse pore layer and a fine pore layer, the fine pore layer being remote from the support member.

4. An electrode as claimed in claim 1 in which the support member is of heat and corrosion resisting metal.

5. An electrode as claimed in claim 1 in which the support member is formed of a sintered ceramic.

6. An electrode as claimed in claim 2 in which the porous layer of electrode material has a coarse pore layer and a fine pore layer, the fine pore layer being remote from the support member.

7. An electrode as claimed in claim 2 in which the support member is of heat and corrosion resisting metal.

8. An electrode as claimed in claim 3 in which the support member is of heat and corrosion resisting metal.

9. An electrode as claimed in claim 2 in which the support member is formed of a sintered ceramic.

10. An electrode as claimed in claim 3 in which the support member is formed of a sintered ceramic.

References Cited in the file of this patent

UNITED STATES PATENTS

| | | |
|---|---|---|
| 2,276,188 | Greger | Mar. 10, 1942 |
| 2,914,596 | Gorin et al. | Nov. 24, 1959 |
| 2,969,315 | Bacon | Jan. 24, 1961 |